UNITED STATES PATENT OFFICE.

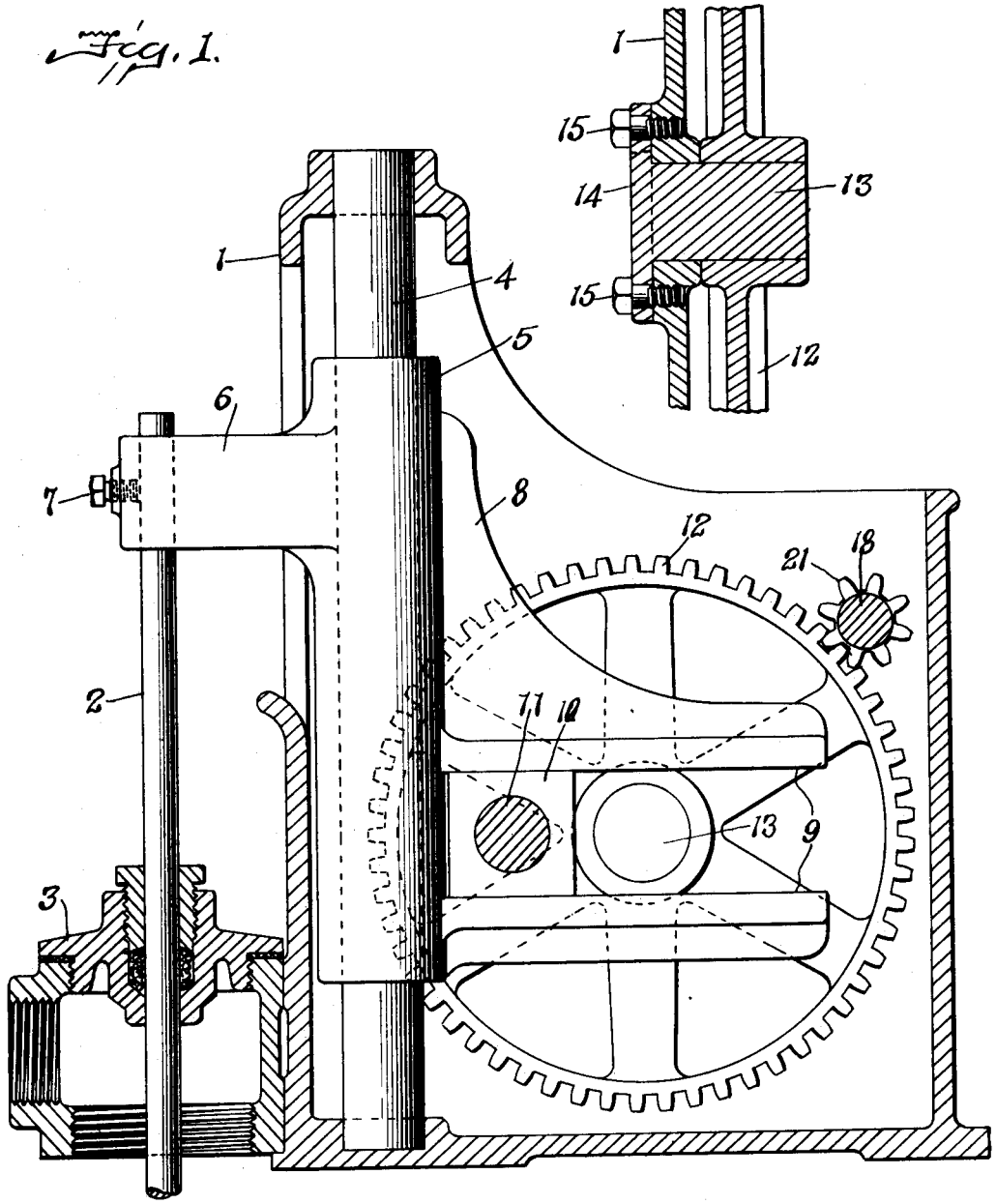

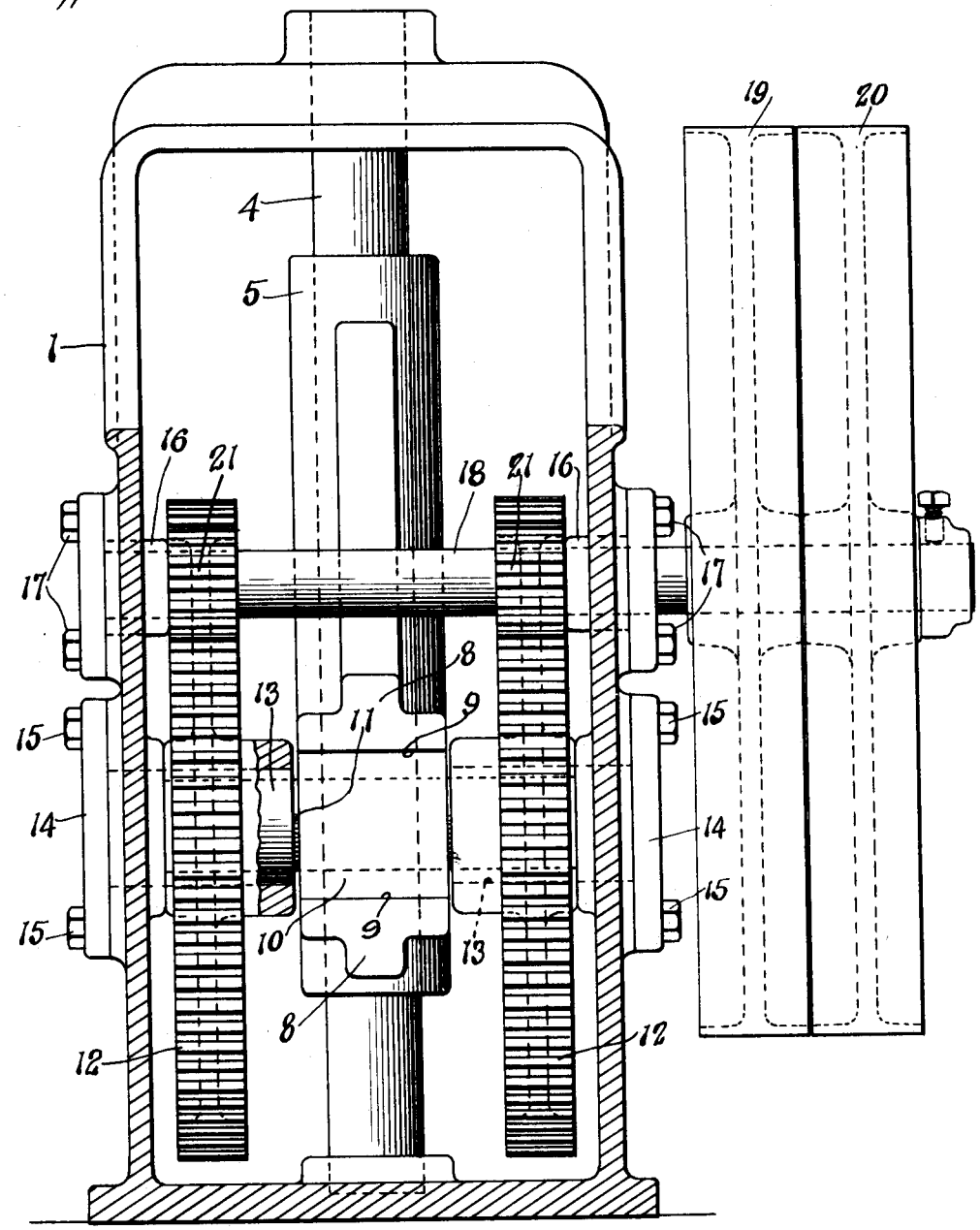

PHILIP A. MYERS, OF ASHLAND, OHIO, ASSIGNOR TO F. E. MYERS AND BROTHER, OF ASHLAND, OHIO, A COPARTNERSHIP CONSISTING OF FRANCIS E. MYERS AND PHILIP A. MYERS.

POWER-HEAD.

1,385,145.  Specification of Letters Patent.  Patented July 19, 1921.

Application filed September 27, 1920. Serial No. 413,021.

*To all whom it may concern:*

Be it known that I, PHILIP A. MYERS, a citizen of the United States, residing at Ashland, in the county of Ashland and State of Ohio, have invented certain new and useful Improvements in Power-Heads, of which the following is a specification, reference being had therein to the accompanying drawing.

This invention relates to improvements in power heads for pumps.

The invention consists, essentially, in combining with a lubricant containing casing a reciprocating member to actuate the pump rod and a rotatable member having a sliding connection with the reciprocating member.

I carry my invention into practical effect by the preferred form of mechanism illustrated in the accompanying drawings.

Figure 1 is a partial side elevation and vertical sectional view of my improved power head and the coöperating parts;

Fig. 2 is a transverse sectional view through the casing showing the interior mechanism in rear elevation; and Fig. 3 is a detail sectional view of one of the stud shafts for supporting the gears, with a part of the casing and of one of the gears also in section.

The numeral 1 designates a vessel or casing, preferably of cast metal, adapted to contain a quantity of lubricant, as also to contain the operating mechanism now about to be described. In practice this casing is suitably secured to the well platform or other support at a point adjacent to the pump stand or head, as illustrated in the accompanying drawings, adjacent to the pump rod 2 which passes through a discharge head 3 attached to the casing. The discharge head sustains the pump proper, which extends below.

In the casing is secured a guide 4, preferably in the form of a rod, though it may be otherwise constructed. On the rod is fitted a reciprocating member 5 in the nature of a sleeve characterized by an arm 6 carrying a set screw 7 to secure the pump rod, and by brackets 8 whose adjacent surfaces 9 are faced off to form slides or ways. Fitted to these ways is a bearing block 10 adapted to slide in them when actuated by the wrist pin 11 carried by a pair of driven gear wheels 12, as more clearly seen in Fig. 2. These gear wheels are mounted on stud shafts 13 integral with or carried by removable bushings 14 secured to the casing, as by screws 15. The object is to readily remove the stud shafts so as to withdraw the gears 12. This construction also facilitates the matter of assembling the mechanism in the casing. Similar bushings 16 are removably fitted in the casing, being held by screws 17, to constitute bearings for a driving shaft 18, which extends across the casing, one end fitting within a step bearing in one bushing and the other passing through the bushing and carrying a fixed belt pulley 19 and a loose belt pulley 20. This driving shaft carries pinions 21, each meshing with one of the gear wheels 12.

In this manner, when motion is imparted to the driving shaft and pinions, by the fixed belt pulley, the gear wheels 12 are rotated and their wrist pin 11 carried through a circular path, thus raising and lowering the bearing block 10 which reciprocates in the ways 9 as it travels in its circular path. It will be noted how direct and simple, and therefore how efficient this organization is as a means of converting the rotary motion of the driving shaft and pinions into a reciprocating motion applied to the sliding or sleeve member which actuates the pump rod.

This pump head has been practically tried out and subjected to regular usage and has been found to be very satisfactory mechanically and commercially, performing all the mechanical and commercial requirements.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a power head the combination with a casing adapted to contain a quantity of lubricant and rotatable operating mechanism therein, of an actuating reciprocating sleeve member operable in the lubricant contained within the casing, integral slides extending from said member and a bearing block mounted in the slides and adapted to be actuated by the rotatable operating mechanism.

2. In a power head the combination with a casing adapted to contain a quantity of lubricant, driving gearing and driven gearing mounted therein, an actuating reciprocating member sleeve operable within the lubricant contained within the casing, integral brackets comprising slides extending from said member and a bearing block mounted in the slides and adapted to be driven by the gearing, of means for attaching the reciprocating member to a pump rod.

3. In a power head the combination with a guide rod, a sleeve mounted thereon with integral slides and an integral arm for attachment to a pump rod, of driving devices having a bearing block adapted to travel within the slides and a casing adapted to contain a quantity of lubricant in which the driving devices, slides and the bearing block operate.

4. In a power head, the combination with a casing adapted to contain a quantity of lubricant, a driving shaft provided with pinions mounted therein, a pair of driving gears having a wrist pin also mounted on the casing and meshing with said pinions, a bearing block carried by the wrist pin, a guide or slide mounted in the casing and a reciprocating sleeve mounted thereon having brackets comprising ways on which the bearing block travels, of means for attaching the reciprocating sleeve to a pump rod.

In testimony whereof I affix my signature.

PHILIP A. MYERS.